(12) United States Patent
Hunter

(10) Patent No.: US 6,186,750 B1
(45) Date of Patent: Feb. 13, 2001

(54) OIL PUMP CONTROL VALVE SPOOL WITH PILOT PRESSURE RELIEF VALVE

(75) Inventor: Douglas G. Hunter, Shelby Township, MI (US)

(73) Assignee: BorgWarner, Inc., Troy, MI (US)

(*) Notice: Under 35 U.S.C. 154(b), the term of this patent shall be extended for 0 days.

(21) Appl. No.: 09/300,689

(22) Filed: Apr. 27, 1999

(51) Int. Cl.[7] ................................................ F04B 49/00
(52) U.S. Cl. ........................ 417/307; 417/308; 417/286; 417/288; 137/115.26; 137/115.13
(58) Field of Search .................... 417/307, 308, 417/310, 302, 286, 288; 137/114, 115.13, 115.26

(56) References Cited

U.S. PATENT DOCUMENTS

| | | |
|---|---|---|
| 2,744,469 | 5/1956 | Schaefer . |
| 2,805,038 | * 9/1957 | Towler et al. ................. 417/307 |
| 3,446,232 | * 5/1969 | Erikson ......................... 417/302 |
| 3,570,522 | * 3/1971 | Horsch et al. ................. 137/115.13 |
| 4,084,604 | 4/1978 | Budecker et al. . |
| 4,279,268 | * 7/1981 | Aubert ........................... 137/115.26 |
| 4,343,324 | 8/1982 | Ohe et al. . |
| 4,412,789 | * 11/1983 | Ohe et al. ....................... 417/288 |
| 4,512,298 | 4/1985 | Hayashi . |
| 4,557,668 | 12/1985 | Jones . |
| 4,611,621 | 9/1986 | Miyakawa et al. . |
| 4,838,767 | 6/1989 | Ohe et al. . |
| 4,967,783 | 11/1990 | Loos . |
| 4,971,528 | 11/1990 | Hodgkins et al. . |
| 5,040,951 | 8/1991 | Nikaido . |
| 5,797,732 | 8/1998 | Watanabe et al. .............. 417/310 |

* cited by examiner

Primary Examiner—Timothy S. Thorpe
Assistant Examiner—Cheryl J. Tyler
(74) Attorney, Agent, or Firm—Philip R. Warn, Esq.; Greg Dziegielewski

(57) ABSTRACT

A valve spool (70) for an oil pump assembly (10) that includes a pilot pressure relief valve (80) to provide pilot pressure relief that increases the stability of the pump assembly (10) and eliminates the delay between the change in the discharge pressure and the associated response to the pilot pressure. The valve spool (70) operates in response to the pilot pressure to increase or decrease the pump discharge pressure during vehicle operation. A chamber (72) within the valve spool (70) is in fluid communication with the discharge flow and pressure at one end and the pilot pressure at the other end. When the pilot pressure exceeds the discharge pressure, the relief valve (80) opens, allowing the discharge pressure and the pilot pressure to equalize.

21 Claims, 2 Drawing Sheets

OIL PUMP CONTROL VALVE SPOOL WITH PILOT PRESSURE RELIEF VALVE

BACKGROUND OF THE INVENTION

1. Field of the Invention

This invention relates generally to an oil pump assembly and, more particularly, to an oil pump assembly that includes a pilot pressure relief valve for equalizing the pump discharge pressure and the control valve pilot pressure.

2. Discussion of the Related Art

Vehicles include an oil pump assembly for pumping engine oil through the vehicle engine to lubricate the engine components through various lubrication channels. FIG. 1 is a cross-sectional view of one type of an oil pump assembly 10 that is used for this purpose in certain vehicles. The assembly 10 includes a metal housing 12 including a pump inlet port 14 connected to an oil source (not shown), a first pump discharge port 16, a second pump discharge port 18, and a pilot pressure inlet port 20. Source oil from the pump inlet 14 is drawn to a first stage pump 24 and a second stage pump 26. The inlet port 14 is also the low pressure exhaust for the pumps 24 and 26. The pumps 24 and 26 are rotated by a chain sprocket mounted on the front of a shaft 28 and can be any suitable pump gear configuration, such as a gerotor assembly. Operation of the pump 24 pumps oil to the first discharge port and operation of the pump 26 pumps oil to the second discharge port 18. The first discharge port 16 is always in fluid communication with the engine 17. The first and second discharge ports 16 and 18 are sometimes in fluid communication based on the position of the control valve spool. The pilot pressure applied to the pilot pressure inlet port 20 is the pressure of the oil in the engine's lubrication channels.

The pump assembly 10 includes the two pumps 24 and 26 to provide the pump discharge flow at both the discharge ports 16 and 18 so that the total discharge flow can be controlled. As the vehicle speed changes the pump speed changes, and thus the discharge flow changes. Therefore, it is necessary to regulate the discharge pressure during vehicle operation to satisfy the engine's oil pressure limits. To provide this regulation, the pump assembly 10, with its control valve, selectively adds or removes the second discharge flow at the discharge port 18 and regulates the first discharge flow at the first discharge port 16. The valve exhaust flows are routed back to the oil source through the pump inlet port 14. The degree and rate at which the first and second discharge flows are changed is determined by the pressure at the pilot pressure port 20.

A valve spool 32 positioned within a housing chamber 34 is employed to change the pump discharge flow when the pilot pressure changes during vehicle operation. The chambers 34 are in fluid communication with the first and second discharge ports 16 and 18 and the pump inlet port 14. A valve spring 36 is positioned within a chamber 37 and a spring land 38 of the valve spool 32 opposite the pilot pressure inlet port 20, and biases the valve spool 32 towards the pilot pressure inlet port 20. The valve spool 32 further includes an intermediate land 40 and a pilot pressure land 42. A narrowed section 44 connects the spring land 38 to the intermediate land 40, and a narrowed section 46 connects the intermediate land 40 to the pilot pressure land 42 to give the valve spool 32 its general shape as shown.

When the pilot pressure at port 20 is below a certain pressure, the valve spool 32 is in the position shown, and the discharge ports 16 and 18 are in fluid communication to allow the complete discharge flow from both the pumps 24 and 26 to lubricate the engine. Also, the discharge ports 16 and 18 are blocked to the exhaust 14. When the pilot pressure increases above a certain pressure, it pushes against the pilot pressure land 42 through the port 20, and the valve spool 32 moves against the bias of the spring 36. Movement of the land 40 begins closing off the second discharge port 18 from the discharge port 16 to reduce the oil discharge flow and pressure, and also begins opening the discharge port 18 to exhaust through channel 48. As the pilot pressure continues to increase, the land 40 will eventually completely close the second discharge port 18 so it is not in fluid communication with the first discharge port 16, and completely open the second discharge port 18 to the exhaust.

If the pilot pressure continues to increase, the valve spool 32 will move far enough against the bias of the spring 36 to cause the spring land 38 to allow the first discharge port 16 to gradually be opened to exhaust through channel 50. Eventually, the spring land 38 will contact the chamber wall 52 preventing further movement of the valve spool 32 in that direction. If the pilot pressure decreases, the valve spool 32 reverses its direction as just described to increase the oil discharge pressure. Thus, the valve spool 32 allows regulation of the engine oil pressure. Operation of the pump assembly as just described is well known in the art.

A problem exists with the operation of the oil pump assembly 10 described above that causes it to be unstable. FIG. 2 is a graph with time on the horizontal and pressure on the vertical axis showing a discharge pressure line 54 for the combined first and second discharge pressures and a pilot pressure line 56 for the pilot pressure. As the discharge pressure rises, the pilot pressure also rises with a certain time lag depending on the particular system, because the pilot pressure is taken from a point inside the engine and not the pump discharge in this design. The time lag as being described herein is directly related to the fact that the pilot pressure is the pressure within the lubrication system and not the actual discharge pressure. This lag can be eliminated by sensing the discharge pressure as it leaves the assembly 10, but certain lubrication system designs benefit from measuring the pilot pressure at this location, as is known in the art.

Once the pilot pressure increases to a certain level, the actuation of the valve spool 32, as discussed above, causes the discharge pressure to begin to decrease at time 58. Because of the lag between the change in the discharge pressure and the associated change in the pilot pressure, the pilot pressure does not immediately decrease when the discharge pressure starts decreasing. Once a certain period of time passes, the pilot pressure begins to decrease at time 60. But, the discharge pressure has been continually decreasing for the period of the time lag. Eventually, the discharge pressure will begin to increase at time 62 because the pilot pressure has been decreasing for some time, but the pilot pressure is still decreasing because of the lag. This process continues through the operation of the assembly 10. This instability in the operation of the pump assembly 10 causes pressure oscillations and added wear and tear on the pump and engine components, reducing device longevity.

It would be desirable to eliminate the lag of the pilot pressure in the oil pump assembly 10 to decrease the oscillation of the valve spool 32 to allow the pump 10 to operate more smoothly. It is therefore an object of the present invention to provide an improved valve spool for the oil pump assembly 10.

SUMMARY OF THE INVENTION

In accordance with the teachings of the present invention, a valve spool for an oil pump assembly is disclosed that includes a pilot pressure relief valve to provide pilot pressure relief to eliminate the lag between the discharge pressure and the pilot pressure described above, and reduce pump instability. The valve spool operates in response to the pilot pressure to increase or decrease the pump discharge pressure during vehicle operation. The pilot pressure relief valve is positioned within an internal chamber in the valve spool. The chamber within the valve spool is in fluid communication with the discharge pressure at one end and the pilot pressure at the other end. When the discharge pressure is greater than the pilot pressure, the relief valve seats against a valve seat to seal the chamber. When the pilot pressure exceeds the discharge pressure, the relief valve opens to unseal the chamber, allowing the discharge pressure and the pilot pressure to equalize, and preventing the unstable condition from developing further.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments directed to a valve spool for an oil pump assembly that provides pilot pressure relief is merely exemplary in nature and is in no way intended to limit the invention or its applications or uses. Particularly, the invention described below is a valve spool intended to replace the valve spool 32 described above, in the two-stage pump assembly 10. However, the invention includes providing pilot pressure relief for remote pilot pressure sensing, and can be used in other types of pump assemblies or other devices that require remote pilot pressure sensing beyond the type discussed above.

Figure 3:
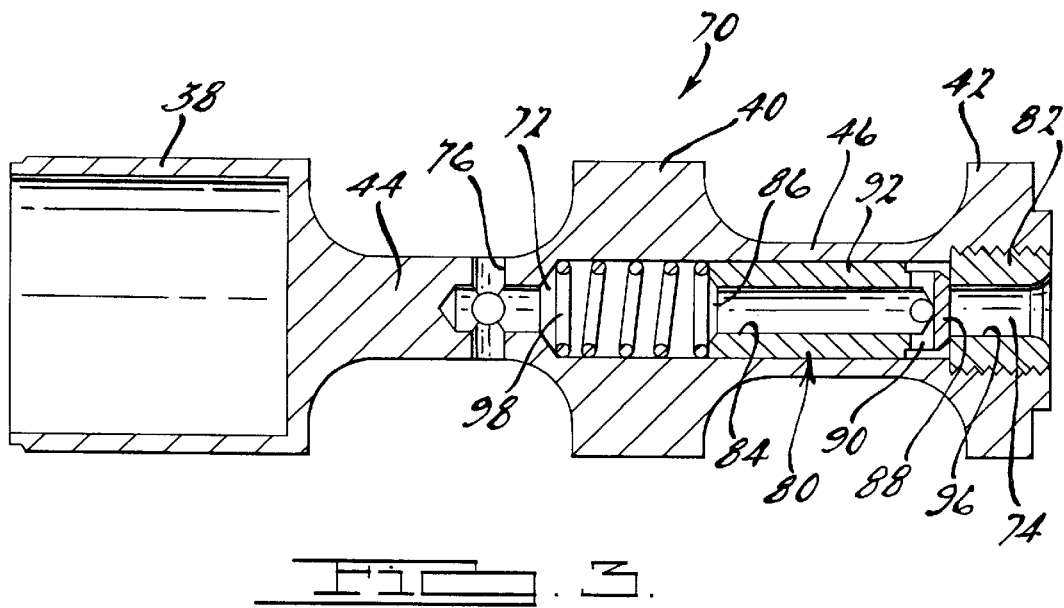
FIG. 3 is a cross-sectional view of a valve spool to be used in an oil pump assembly of the type shown in FIG. 1 that provides pilot pressure relief without the time lag, according to an embodiment of the present invention.

FIG. 3 is a cross-sectional view of a valve spool 70 that replaces the valve spool 32 in the oil pump assembly 10 to provide pilot pressure relief, while eliminating the time lag between the changes in the discharge pressure and the change in the pilot pressure. The valve spool 70 has the general shape of the valve spool 32 described above and fits within the chamber 34 in the same manner. Like features have the same reference numerals referred to above for clarity purposes, and operate in the same manner.

Instead of being a solid member, the valve spool 70 includes an internal bore 72 that extends from an opening 74 at the end of the valve spool 70 proximate the pilot pressure land 42 to a plurality of orifices 76 in the narrowed section 44. The bore 72 allows the discharge flow applied to the discharge ports 16 and 18 to be in fluid communication with the pilot pressure flow at the port 20, as will be discussed below.

A cylindrical relief valve member 80 is positioned within the bore 72 and is held within the bore 72 by a plug 82 threaded into the opening 74. The valve member 80 includes an internal bore 84 extending from an end wall 86 of the valve member 80 to an end cap 88 of the valve member 80. A plurality of orifices 90 are provided through a side wall 92 proximate the end cap 88 of the member 80 so that the bore 84 is open at both ends. A bore 96 extends through the plug 82 so that the discharge from the pilot pressure flow pushes against the end cap 88. A pilot pressure spring 98 is positioned within the chamber 72 against the end wall 86 to bias the valve member 80 against the plug 82 to seal the chamber 72. The pilot pressure spring 98 may be an optional spring in that the valve member 80 can float within the bore 72, and move with the discharge pressure and the pilot pressure in the desired manner.

The discharge pressure at the ports 16 and 18 is applied at one end of the bore 72 through the orifices 76, and forces the end cap 88 of the valve member 80 to seat against the plug 82 in conjunction with the bias of the spring 98. If the pilot pressure increases above the discharge pressure at the ports 16 and 18 combined with the spring bias, the pilot pressure applied to the end cap 88 through the opening 96 in the plug 82 forces the valve member 80 to move against the pressure of a discharge pressure and the spring bias. This allows the pilot pressure flow to enter the bore 72 through the orifices 90. The increase in pilot pressure also causes the valve spool 70 to move against the bias of the spring 36 to control the discharge flow for the desired engine oil pressure in the manner as discussed above.

Figure 1:
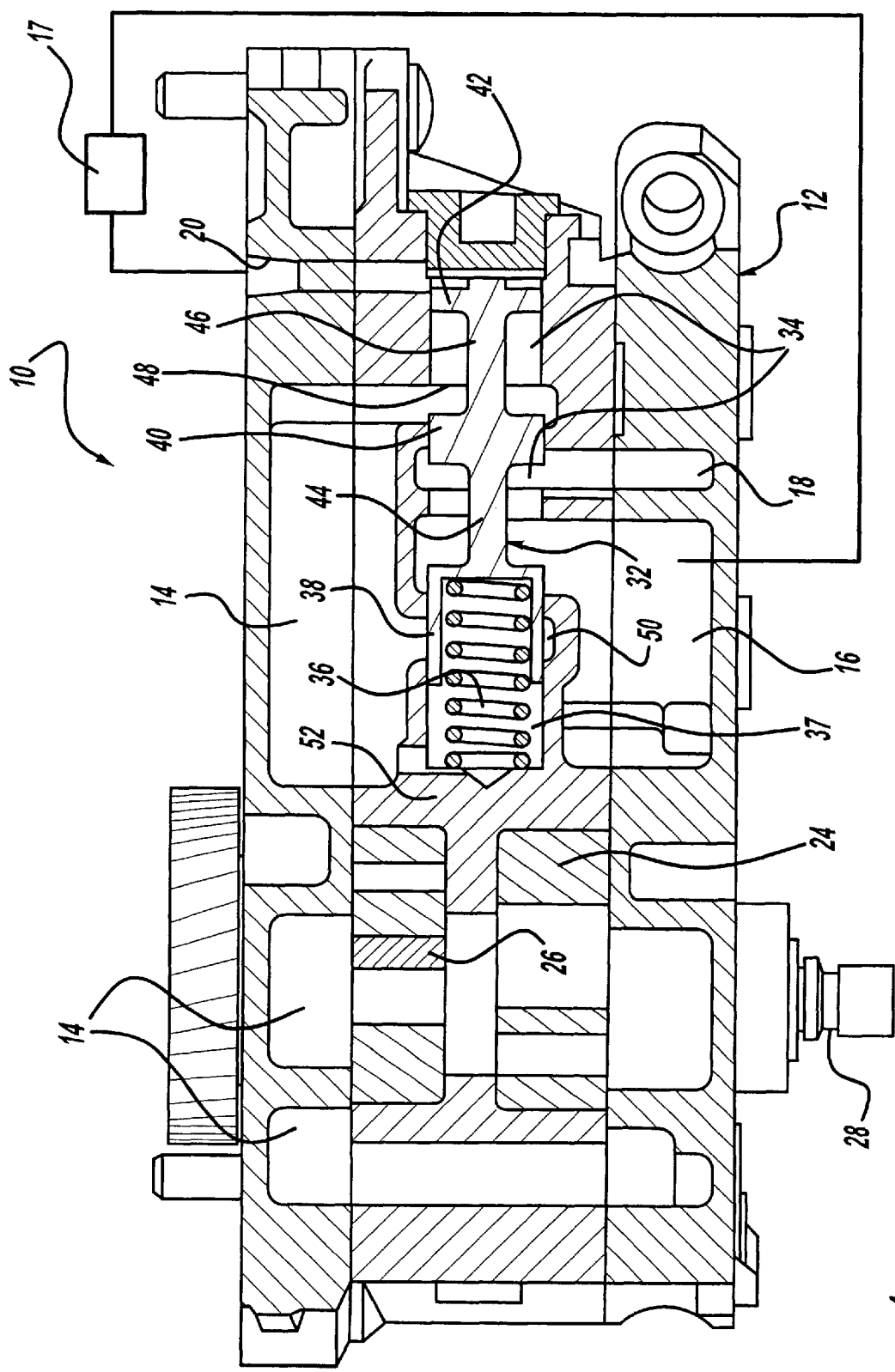
FIG. 1 is a cross-sectional perspective view of a known oil pump assembly including a valve spool.
Figure 2:
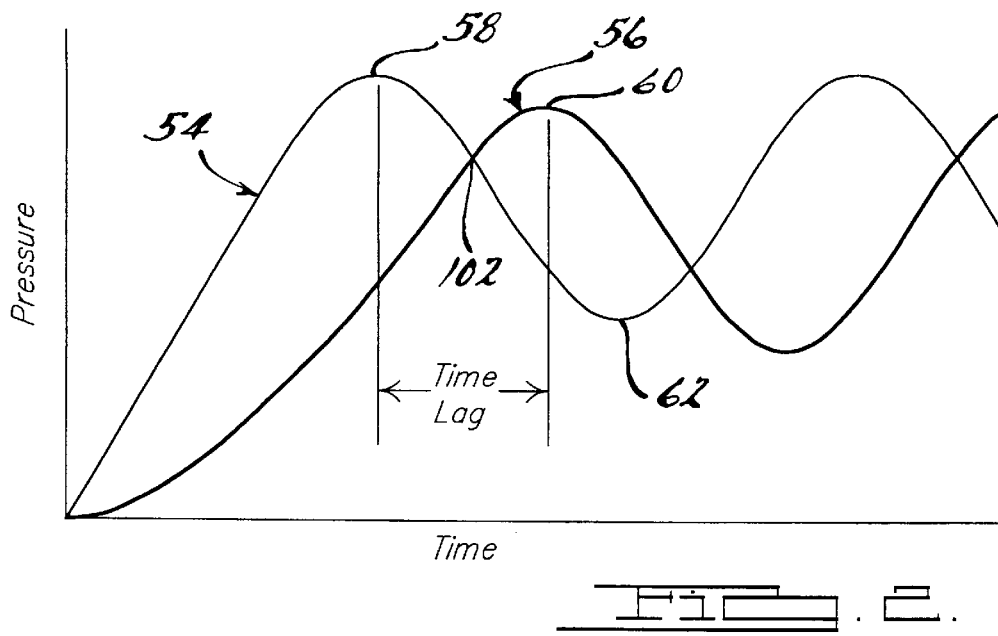
FIG. 2 is a graph with pressure on the vertical axis and time on the horizontal axis showing the time lag between changes in the pilot pressure relative and changes in the discharge pressure for the oil pump assembly shown in FIG. 1.

By allowing the discharge pressure and the pilot pressure to equalize in the bore 72 when the pilot pressure increases above the discharge pressure, the time lag discussed above is eliminated, and the assembly 10 operates more smoothly. Therefore, by operation of the valve member 80, the discharge pressure and the pilot pressure substantially equalize at time 102 in the graph of FIG. 2.

The configuration of the valve spool 70 as described operates as a check valve to reduce the pilot pressure when the pilot pressure increases above the discharge pressure. The operation of the valve spool 70 provides for discharge pressure relief at the pump assembly 10, as opposed to in the engine lubrication circuit. The operation of the valve member 80, according to the invention, can be used to provide pilot pressure relief in other pump assemblies, including pump assemblies including a single pump.

The foregoing discussion discloses and describes merely embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A pump assembly for delivering lubricant flow, said pump assembly comprising:

a housing, said housing including a pump inlet, a pump discharge outlet, and a pilot pressure inlet, said pilot pressure inlet taken from a point remote from said pump discharge outlet; and a control valve positioned within the housing, said control valve including a first end and a second end, said first end of the control valve being in fluid communication with the pilot pressure inlet, said control valve further including an internal chamber and a pilot pressure check valve positioned within the chamber, said chamber being in fluid communication with the pilot pressure inlet and the discharge outlet and said check valve providing pilot pressure relief to equalize the pilot pressure and the discharge pressure.

2. The pump assembly according to claim 1 wherein the check valve is a cylindrical member including an internal bore that is in fluid communication with the pump discharge at one end and the pilot pressure inlet at an opposite end.

3. The pump assembly according to claim 2 wherein the check valve seals the chamber when the discharge pressure is greater than the pilot pressure.

4. The pump assembly according to claim 1 wherein the check valve includes an internal bore, an end cap and at least one orifice formed through a side wall, said end cap being seated against a check valve seat when the discharge pressure is greater than the pilot pressure to prevent a pilot pressure flow from entering the chamber within the control valve.

5. The pump assembly according to claim 4 wherein the control valve further includes a relief valve plug threaded into an end of the control valve, said valve plug being in contact with the end cap when the discharge pressure is greater than the pilot pressure to seal the chamber.

6. The pump assembly according to claim 4 wherein the control valve further includes a relief valve spring, said relief valve spring being positioned in the chamber between the check valve and at least one orifice, said relief valve spring biasing the check valve towards the end cap.

7. An engine oil pump assembly for controlling the flow of engine oil, said pump assembly comprising:
  a housing, said housing including a pump inlet, a pilot pressure inlet, and a pump discharge outlet, said pump inlet being in fluid communication with an oil source, said pilot pressure inlet and said discharge outlet being in fluid communication with an engine;
  a first pump positioned within the housing and being in fluid communication with the pump inlet, said first pump providing a first stage discharge flow to the discharge outlet; and
  a valve spool positioned within the housing, said valve spool including a first end and a second end, said first end of the valve spool being in fluid communication with the pilot pressure inlet and said second end of the valve spool being in contact with a biasing spring seated within the housing, said spring biasing the valve spool to a first valve position, said valve spool further including an internal chamber and a pilot pressure relief valve positioned within the chamber, said chamber being in fluid communication with the pilot pressure inlet and the discharge outlet, said pilot pressure relief valve providing pilot pressure relief.

8. The pump assembly according to claim 7 wherein the chamber is in fluid communication with the discharge outlet through at least one orifice formed through a wall in a narrowed portion of the valve spool.

9. The pump assembly according to claim 8 wherein the chamber is in fluid communication with the pilot pressure inlet through an opening in an end of the valve spool opposite the biasing spring.

10. The pump assembly according to claim 9 wherein the relief valve member includes a relief valve chamber, said relief valve chamber being in fluid communication with the at least one orifice and the opening in the end of the valve spool.

11. The pump assembly according to claim 10 wherein the relief valve includes an end cap that seats against a valve seat within the relief valve chamber when the pressure of the first stage discharge flow is greater than the pilot pressure.

12. The pump assembly according to claim 8 wherein the valve spool further includes a relief valve spring in contact with the relief valve, said relief valve spring being positioned in the chamber between the relief valve and the at least one orifice, said relief valve spring biasing the relief valve away from the at least one orifice.

13. The pump assembly according to claim 7 wherein the valve spool further includes a relief valve plug threaded into an end of the valve spool opposite the biasing spring, said plug holding the relief valve within the valve spool.

14. The pump assembly according to claim 7 wherein the valve spool includes a pilot land, a valve land and a spring land, said pilot land and said valve land being connected by a first narrowed portion and said valve land and said spring land being connected by a second narrowed portion, said pilot land being positioned adjacent to the pilot pressure inlet, said valve land being positioned adjacent to the first discharge outlet, and said biasing spring being positioned within the spring land.

15. The pump assembly according to claim 14 wherein the pilot pressure relief valve is positioned within the chamber in the first narrowed portion (46).

16. The pump assembly according to claim 7 wherein the valve spool moves to a second position against the bias of the spring when the pilot pressure is greater than the first discharge flow pressure.

17. The pump assembly according to claim 7 further comprising a second pump positioned within the housing and being in fluid communication with the pump inlet, said second pump providing a second stage discharge fluid flow to a second discharge outlet.

18. The pump assembly according to claim 17 wherein the first discharge outlet is in fluid communication with the second discharge outlet when the valve spool is in the first position and the second discharge outlet is in fluid communication with the pump inlet and not in fluid communication with the first discharge outlet when the valve spool is in a second position, said valve spool moving to the second position against the bias of the biasing spring when the pilot pressure is greater then the first discharge flow pressure.

19. A method of equalizing the pressure between a pilot pressure and pump discharge pressure in a pump assembly, said method comprising the steps of:
  providing a pump discharge pressure from the pump assembly;
  providing a pilot pressure to the pump assembly, which is taken from a point remote from said pump discharge pressure;
  applying the discharge pressure and the pilot pressure to a movable control valve positioned within the assembly; and
  equalizing the discharge pressure and the pilot pressure through a chamber (72) extending through the control valve.

20. The method according to claim 19 wherein the step of equalizing the discharge pressure and the pilot pressure includes the steps of positioning a check valve within the chamber and causing the check valve to open the chamber when the pilot pressure is greater than the discharge pressure.

21. The method according to claim 20 wherein the step of positioning the check valve includes positioning a cylindrical check valve including an internal bore extending through one end of the check valve, an end cap at an opposite end of the check valve, and at least one orifice extending through a side wall of the check valve to the internal bore.

* * * * *

UNITED STATES PATENT AND TRADEMARK OFFICE
CERTIFICATE OF CORRECTION

PATENT NO. : 6,186,750 B1 Page 1 of 1
DATED : February 13, 2001
INVENTOR(S) : Douglas G. Hunter It is certified that error appears in the above-identified patent and that said Letters Patent is hereby corrected as shown below:

<u>Column 1,</u>
Line 27, after "port" insert -- 16 --.

<u>Column 2,</u>
Line 27, after "horizontal" insert -- axis --.

Signed and Sealed this

Seventeenth Day of February, 2004

JON W. DUDAS
*Acting Director of the United States Patent and Trademark Office*